(12) United States Patent
Snider

(10) Patent No.: US 6,428,174 B1
(45) Date of Patent: Aug. 6, 2002

(54) VACUUM FLUORESCENT DISPLAY PANEL WITH INTEGRAL ILLUMINATION OF PANEL INDICIA

(75) Inventor: Chris Ralph Snider, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/842,886

(22) Filed: Apr. 27, 2001

(51) Int. Cl.[7] .............................................. G01D 11/28
(52) U.S. Cl. ............................. 362/27; 362/26; 362/85
(58) Field of Search ................................ 362/26, 27, 28, 362/29, 30, 560, 488, 489, 511, 544, 84, 85

(56) References Cited

U.S. PATENT DOCUMENTS

| | | | | |
|---|---|---|---|---|
| 1,723,113 A | * | 8/1929 | Zubaty | 362/28 |
| 1,787,684 A | * | 1/1931 | Jacobi | 180/90 |
| 2,831,453 A | * | 4/1958 | Hardesty | 116/228 |
| 4,882,659 A | | 11/1989 | Gloudemans | 362/511 |
| 5,053,928 A | * | 10/1991 | Pasco | 362/24 |
| 5,390,085 A | * | 2/1995 | Mari-Roca et al. | 362/31 |
| 5,477,430 A | * | 12/1995 | LaRose | 362/84 |

* cited by examiner

Primary Examiner—Alan Cariaso
Assistant Examiner—Sharon Payne
(74) Attorney, Agent, or Firm—Jimmy L. Funke

(57) ABSTRACT

An improved vacuum fluorescent (VF) display panel includes a VF display device having an integral VF light source that is shielded from viewer of the display, and that provides illumination for panel indicia formed in the vicinity of the VF display. The integral light source for indicia illumination is produced at one or more marginal areas of the VF display by secondary anode segments and an integral reflector structure that directs the light produced by the secondary anode segment(s) laterally through a transparent side glass of the display housing. A light-pipe structure adjacent the VF display receives the laterally directed light, and uses the received light to illuminate the panel indicia.

6 Claims, 3 Drawing Sheets

VACUUM FLUORESCENT DISPLAY PANEL WITH INTEGRAL ILLUMINATION OF PANEL INDICIA

TECHNICAL FIELD

This invention relates to instrument panels incorporating a vacuum fluorescent (VF) display, and more particularly to illumination of instrument panel indicia by the VF display.

BACKGROUND OF THE INVENTION

Vacuum fluorescent (VF) displays are generally manufactured in the form of a glass housing having an evacuated central cavity containing phosphored anode segments arranged in a suitable display pattern, and a grid disposed between the anode segments and a filament (cathode). The filament is electrically heated to generate a cloud of electrons, which are attracted by the grid and driven into the phosphored anode segments, resulting in emission of light at the phosphor surface. The emitted light is very bright, but is usually extensively filtered so that a viewer of the panel only sees the illuminated anode segments. Frequently, the instrument panel is also provided with separate light sources for illumination of other indicia formed on the panel. In an automotive radio or HVAC control panel, for example, a VF display is used to communicate certain parameters to the operator, and various incandescent light sources are used to illuminate legends or other indicia on adjacent control knobs or buttons. The indicia light source and associated light-piping can significantly increase the size, complexity and cost of the display panel, and a considerable effort is typically entailed in matching the color of the indicia illumination with that of the display illumination. Accordingly, what is needed is a way of using light from the VF display to illuminate other indicia of the instrument panel.

SUMMARY OF THE INVENTION

The present invention is directed to an improved display panel including a VF display having an integral VF light source that is shielded from viewer of the display, and that provides illumination for display panel indicia formed in the vicinity of the VF display. According to the invention, the integral light source for indicia illumination is produced at marginal areas of the VF display by one or more secondary anode segments and associated reflector structures that direct the light produced by the secondary anode segments laterally through a transparent side glass of the display housing. A light-pipe structure adjacent the VF display receives the laterally directed light, and uses the received light to backlight the panel indicia.

DESCRIPTION OF THE PREFERRED EMBODIMENT

Figure 1:
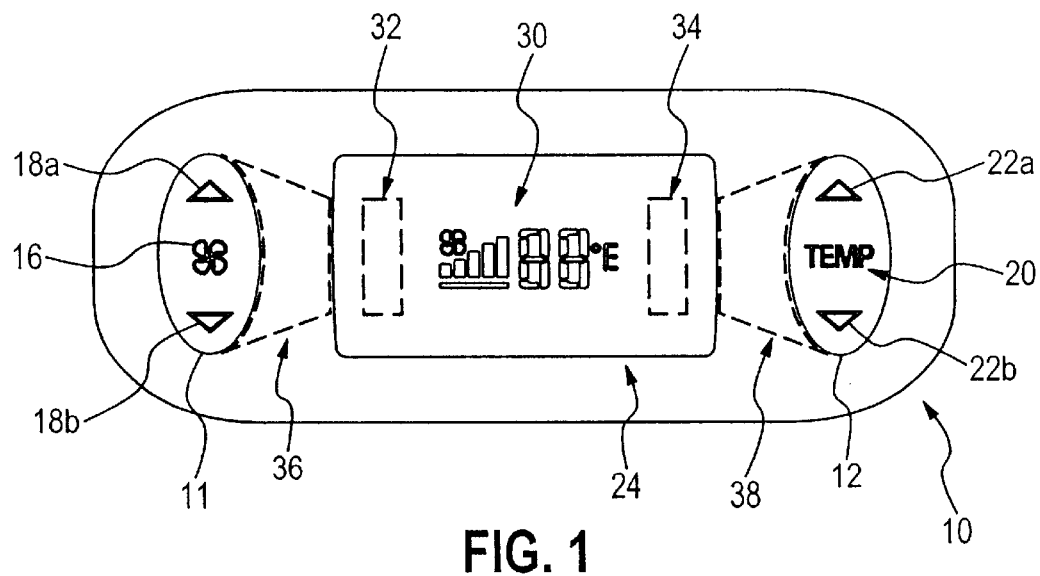
FIG. 1 is a frontal view of a VF display panel according to this invention.
Figure 2:
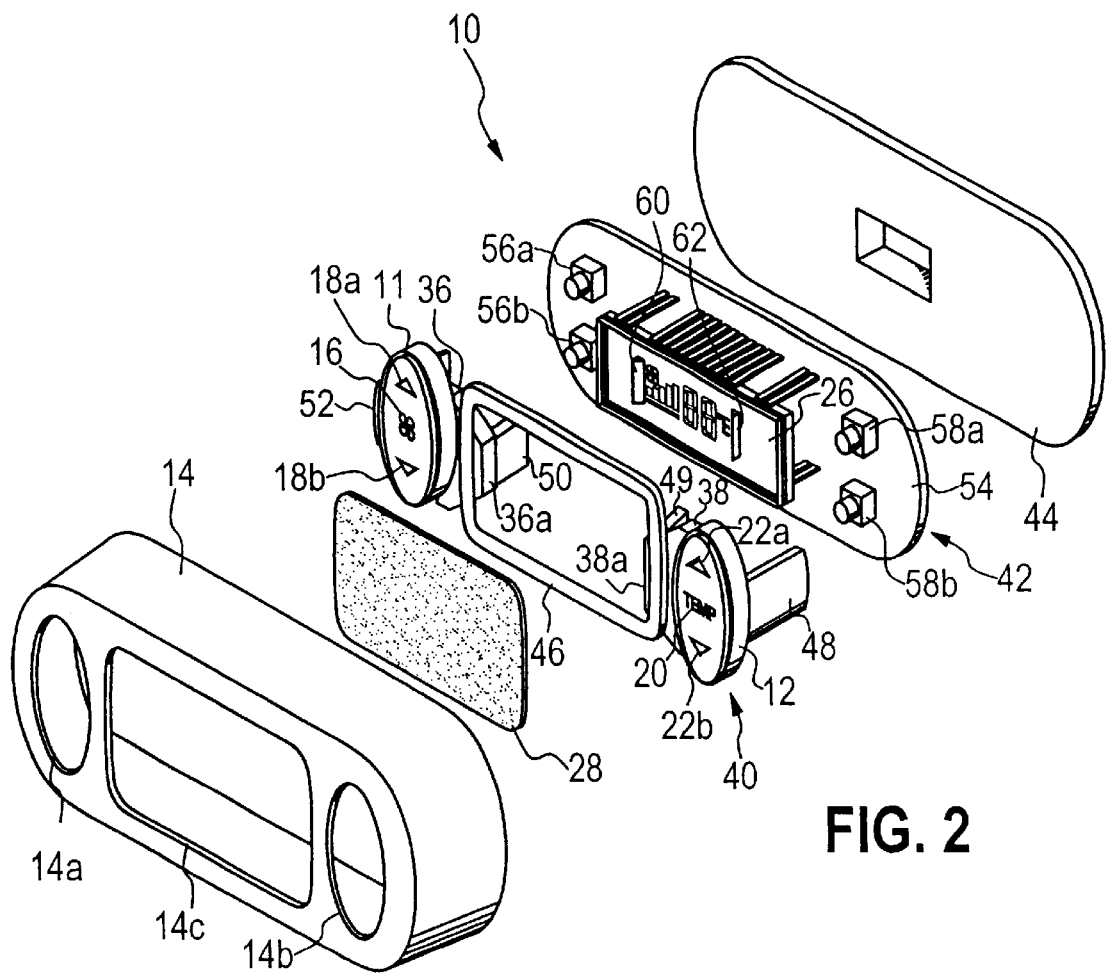
FIG. 2 is an exploded view of the VF display panel of FIG. 1.

The present invention is illustrated in the context of a motor vehicle automatic climate control head, generally designated by the reference numeral 10 in FIGS. 1 and 2. The control head 10 is designed to be mounted in the instrument panel of a motor vehicle for receiving operator inputs relating to fan speed and set temperature, and for displaying system parameters of interest, such as fan speed, set temperature, and outside temperature. In the illustrated embodiment, a pair of momentary contact pushbuttons 11, 12 protrude through openings 14a, 14b in the control head housing 14 for operator entry of the desired fan speed and set temperature, respectively. The pushbutton 11 has a fan indicator 16, and a pair of directional indicia 18a, 18b; the indicator 16 denotes the function controlled by the pushbutton 11, while the directional indicia 18a, 18b denote the manner and direction of fan speed adjustment. Similarly, the pushbutton 12 has a TEMP indication 20 to denote the controlled function (set temperature), and a pair of directional indicia 22a, 22b to denote the manner and direction of temperature adjustment. A VF display generally designated by the reference numeral 24 in FIG. 1 is aligned with a housing opening 14c between the pushbuttons 11 and 12, and includes a vacuum fluorescent (VF) display device 26 and a tinted lens 28. The VF display device 26 has a number of primary anode segments 30 that are selectively activated to display the system parameters, as mentioned above. The reference numerals 32 and 34 in FIG. 1 designate marginal areas of the display device 26 that are concealed from the viewer, but that produce light that is directed into the pushbuttons 11, 12 by light-pipe structures 36, 38 for illuminating the indicia 16, 18a, 18b, 20, 22a, 22b, as explained below.

Referring particularly to FIG. 2, the control head 10 comprises three principle components assembled into the housing 14—the tinted lens 28, a pushbutton and light-pipe assembly 40, and a display and circuit board assembly 42—and a rear cover plate 44 for retaining the components within the housing 14. The assembly 40 includes the pushbuttons 11, 12, the light-pipe structures 36, 38, a support frame 46 for supporting the tinted lens 28, and a set of spacer elements 48, 49, 50, 52 for locating the pushbutton and light-pipe assembly 40 with respect to the display and circuit board assembly 42. The display and circuit board assembly 42 includes a circuit board 54 supporting the VF display device 26 and first and second pairs of micro-switches 56a, 56b and 58a, 58b. The display device 26 is centered relative to the support frame 46, the micro-switches 56a, 56b are located for activation by the pushbutton 11, and the micro-switches 58a, 58b are located for activation by the pushbutton 12.

In operation, the light emanating from the primary anode segments 30 is attenuated by the tinted lens 28 for viewing by the vehicle occupants, whereas the light emanating from secondary anode segments 30' disposed in the marginal areas 32 and 34 is shielded from view and directed laterally by the reflector structures 60, 62. The light that is laterally directed by reflector structure 60 impinges on the inboard face 36a of light-pipe 36, while the light that is laterally directed by reflector structure 62 impinges on the inboard face 38a of light-pipe 38. The light-pipes 36 and 38 are formed of poly-carbonate or other suitable light conducting material, and direct the light into the respective pushbuttons 11, 12 which are formed of a similar material. The front faces of light-pipes 36, 38 and pushbuttons 11, 12 are coated with an opaque material except in the areas defined by the indicia 16, 18a, 18b, 20, 22a, 22b so that the light received by light-pipes 36, 38 is visible to the operator only in the areas defined by the indicia 16, 18a, 18b, 20, 22a, 22b.

Figure 3:
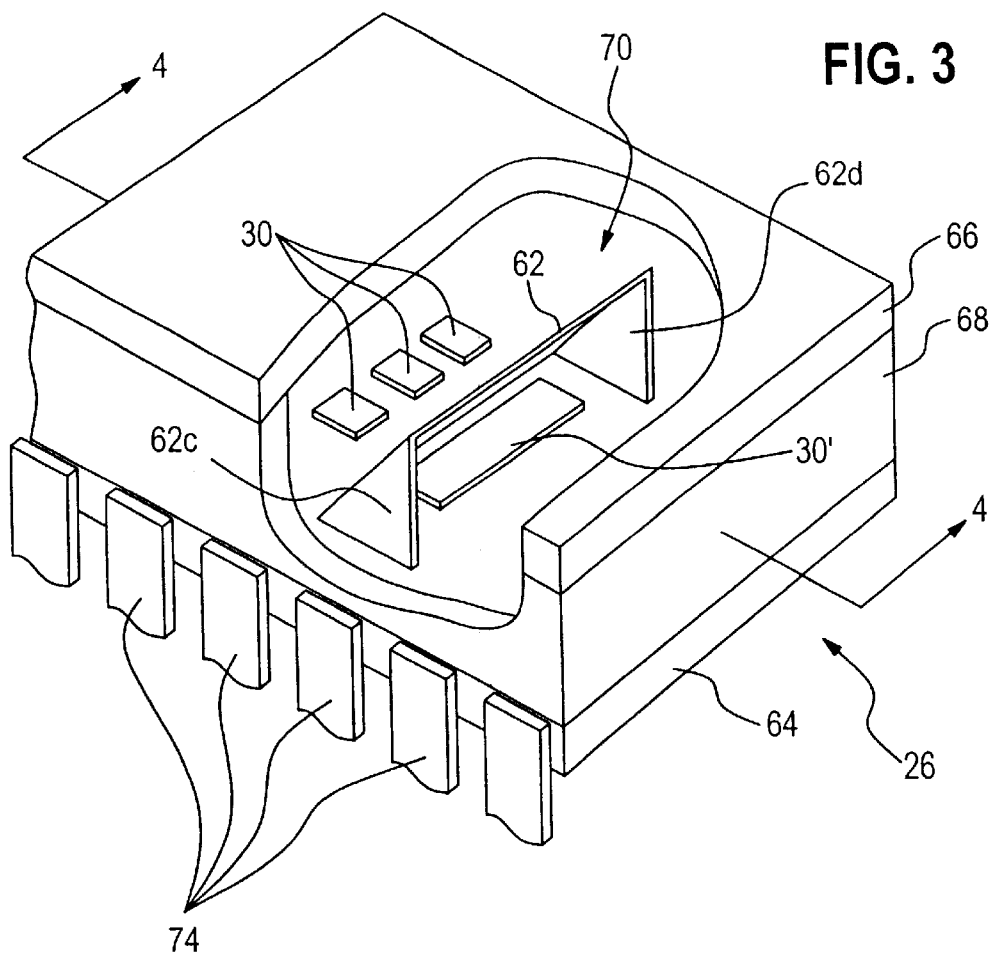
FIG. 3 is a partial isometric view of a VF display device according to a preferred embodiment of this invention.
Figure 4:
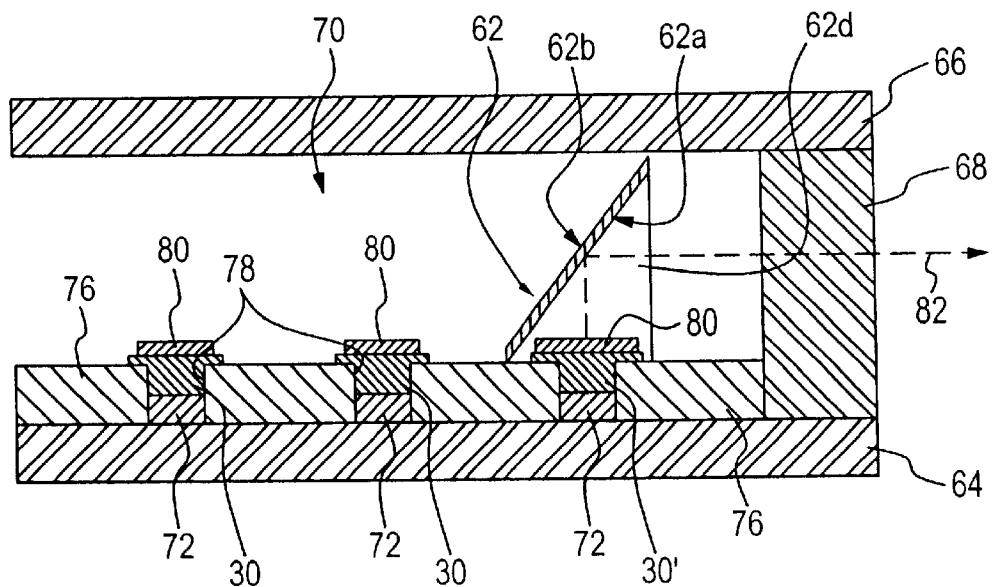
FIG. 4 is a partial cross-sectional view of the VF display device of FIG. 3.

Referring to FIGS. 3 and 4 it will be seen that the VF display device 26 comprises three glass layers: a planar bottom layer 64, a transparent planar top layer 66, and a transparent marginal spacer layer 68. The spacer layer 68 separates the top and bottom layers 66, 64, creating a sealed cavity 70 in which the electrical elements (anodes, cathodes and grid) of the display 26 are disposed. The primary and secondary anode segments 30 and 30' are formed on bottom layer 64 by successive deposition. Anode conductors 72, which are electrically coupled to respective terminals 74 of the VF display device 26, are deposited directly on the bottom layer 64 as seen in FIG. 4, and an insulation layer 76 is deposited over the bottom layer 64 and conductors 72, leaving through-holes 78 over the conductors 72 in the areas where the anode segments 30, 30' are to be formed. The anode segments 30, 30' and phosphor material 80 are then deposited in the area of the through-holes 78, completing the formation of anode segments 30, 30'. Thereafter, the reflector structures 60, 62 are then placed on and adhered to the insulation layer 76 so as to cover the secondary anode segments 30'. The reflector structure 62 (as well as the reflector structure 64) is preferably formed of metal having a highly reflective inboard surface 62a and dark non-reflective outboard surface 62b and triangular side elements 62c, 62d; its function is to direct the light emanating from the secondary anode segment 30' laterally through the transparent spacer layer 68 as indicated by the arrow 82, while shielding such light from the view of the vehicle occupants.

Figure 5:
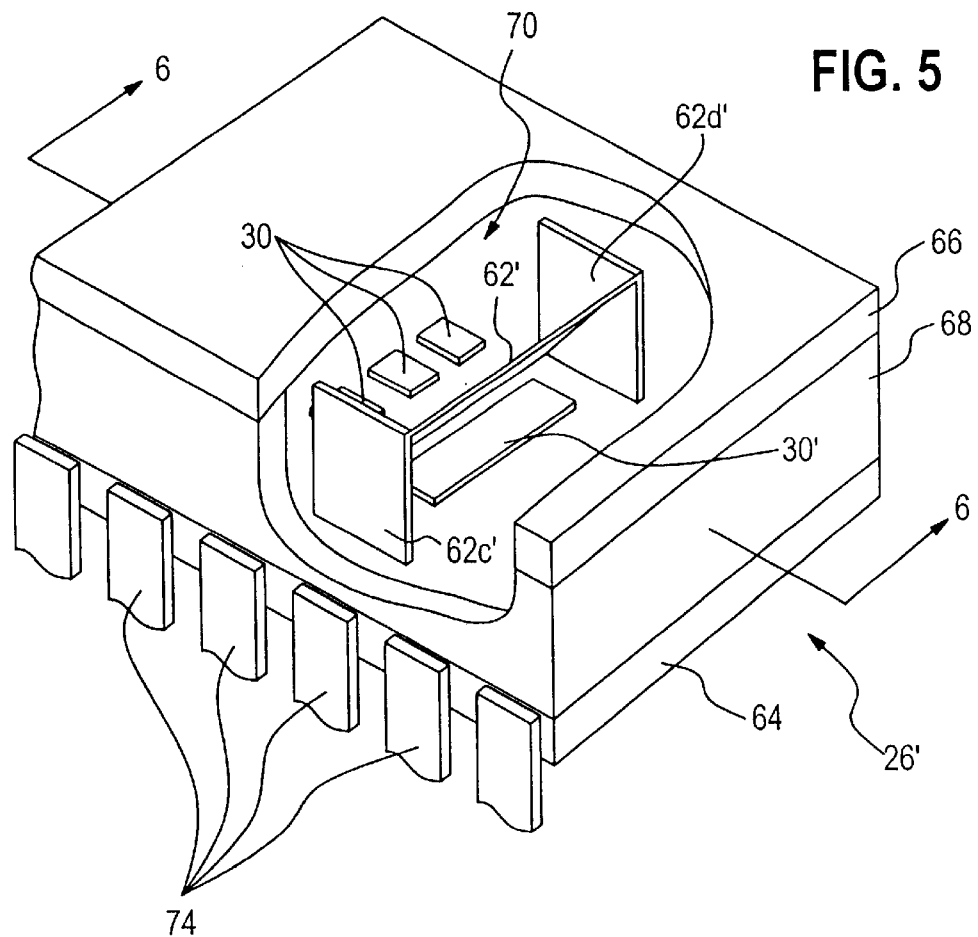
FIG. 5 is a partial isometric view of a VF display device according to an alternate embodiment of this invention.
Figure 6:
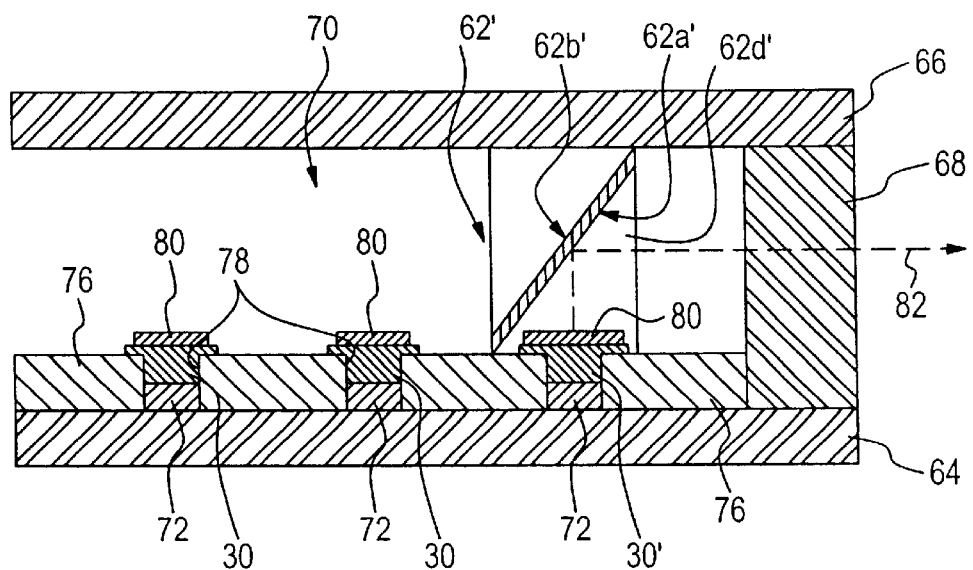
FIG. 6 is a partial cross-sectional view of the VF display device of FIG. 5.

An alternative embodiment of the reflector structure 62 is depicted in FIGS. 5–6, where the reference numerals of FIGS. 3–4 have been repeated to identify common elements. Here, the reflector structure is identified by the reference numerals 62', 62a', 62b', 62c and 62d, the principle difference being that the side surfaces 62c', 62d' are rectangular in shape, and may be adhered to both the insulation layer 76 and the top glass layer 66 as shown.

In summary, the display of this invention provides an improved and cost effective way of using a VF display to illuminate panel indicia disposed adjacent to the display. The requirement for separate panel illumination light sources is eliminated, and the color of the light illuminating the panel indicia is inherently matched to the color of the light emanating from the primary display segments. While the present invention has been described in reference to the illustrated embodiments, it is expected that various modification in addition to those mentioned above will occur to those skilled in the art. Thus, it will be understood that displays incorporating these and other modifications may fall within the scope of this invention, which is defined by the appended claims.

What is claimed is:

1. A VF display panel including a vacuum fluorescent (VF) display having primary anode segments formed on a bottom layer of said display and selectively activated to display a parameter to a viewer of the display panel, and light conducting panel indicia disposed in proximity to the VF display, further comprising:

a secondary anode segment formed on the bottom layer in a marginal area of said VF display laterally displaced from said primary anode segments, and activated to define a secondary light source;

a reflector structure disposed relative to said secondary anode segment so as to shield light emanating from said secondary anode segment from the viewer while reflecting such light laterally through a transparent spacer layer of said VF display; and a light-pipe disposed between said spacer layer and said light conducting panel indicia so that the light laterally reflected by said reflector structure illuminates said panel indicia.

2. The VF display panel of claim 1, wherein first and second light conducting panel indicia are disposed in proximity to opposite lateral edges of the VF display, the VF display panel comprising:

first and second secondary anode segments formed in first and second laterally opposite marginal areas of said VF display, laterally displaced from said primary anode segments, and activated to define first and second secondary light sources;

first and second reflector structures disposed relative to said first and second secondary anode segments so as to shield light emanating from said first and second light sources from the viewer while reflecting such light laterally outward through the transparent spacer layer of said VF display; and first and second light-pipes disposed between said laterally opposite portions of said spacer layer and said first and second light conducting panel indicia so that the light laterally reflected by said first and second reflector structures illuminates said first and second light conducting panel indicia.

3. The VF display panel of claim 1, wherein said reflector structure comprises:

a planar plate supported on the bottom layer of said display and extending from the bottom layer at an oblique angle; and support plates supported on the bottom layer of said display and disposed at opposite lateral ends of said planar plate to support said planar plate with respect to said bottom layer.

4. The VF display panel of claim 3, wherein said support plates are triangular in shape and extend between said planar plate and said bottom layer.

5. The VF display panel of claim 3, wherein said support plates are rectangular in shape and extend between said bottom layer and a top layer of said display.

6. The VF display panel of claim 3, wherein an inboard reflecting surface of said planar plate is reflective, and an outboard surface of said planar plate is dark and non-reflective.

* * * * *